Patented June 22, 1954

2,681,894

UNITED STATES PATENT OFFICE 2,681,894

WATER SOLUBLE HARDENABLE RESINOUS COMPOSITIONS

Herbert Hoenel, Graz, Austria

No Drawing. Application February 3, 1949,
Serial No. 74,491

16 Claims. (Cl. 260—20)

This invention relates to resinous compositions which are soluble in water, at least when used in conjunction with a subordinate proportion of organic solvents which are miscible or to a considerable extent compatible with water and to their aqueous solutions which are especially useful as varnishes, binding agents, impregnating agents, adhesives and the like. This invention further is concerned with the process of producing such resinous compositions and their solutions respectively.

These products substantially are combination products of the following components which, partly at least, form chemical compounds with each other:

*Component I.*—A hardenable condensation product obtained from an aldehyde, which is water-soluble or at least hydrophilic and generally contains active methylol groups, such as resols or aminoplasts;

*Component II.*—A comparatively high molecular compound which due to markedly aliphatic groups present exercises a plasticizing action; it is further characterized by the presence of carboxylic and numerous hydrophilic groups supporting its compatibility with water; such substances are e. g. readily accessible by forming alkyd resins from suitable constituents; the term "comparatively high molecular" meaning a molecular size of at least several hundred, which, of course, must not exceed the still soluble condition;

*Component III.*—Ammonia or a water soluble strong organic nitrogen base which reacts with component II to form a water soluble soap.

The water solubility of this resin soap in many cases is supplemented by the simultaneously employed component I but, on the other hand, the component III may also support the water solubility of component I. In certain cases, the components are preferably not combined until shortly before the aqueous varnish is used. Frequently even a somewhat smaller proportion of component III is sufficient than is necessary for complete neutralization. Briefly said, in a striking way the components mutually influence one another favorably with regard to water solubility of the total composition.

The proportion of component I to component II may vary quite widely, the rather narrow range of about 1 to 1 to 1 to 1.7 being specifically shown in the examples.

Component I imparts to the whole composition the property of passing into the insoluble and infusible condition on curing under heat. This property of the product according to the invention makes it or its aqueous solutions suitable for industrial stoving varnishes, etc. It is, however, not necessary that component I when heated alone should be transformed into the insoluble and infusible condition. When this component is referred to herein as "hardenable," there is to be understood by this term both condensation products which are thermosetting, i. e. which become infusible when heated alone, and also condensation products which on heating reach a relatively high molecular but not infusible state.

Examples of suitable hardenable condensation products (component I) are phenol alcohols and polyalcohols, i. e. low molecular ompounds of mono- or polynuclear phenols with formaldehyde obtained by alkaline condensation (however freed from the caustic alkali), and also crystalline or preferaby amorphous formaldehyde compounds of urea, thiourea, melamine, etc., which are also methylol compounds or derivatives thereof having left only a part of the original active methylol groups. It will be observed that the foregoing phenol alcohols, more particularly methylol compounds, are derived from phenols having only one phenolic OH per nucleus, as appears in the following examples.

The hydrophilic groups of component II include oxygen-containing groups such as ester, ether, carbonyl and particularly hydroxyl groups. In most cases the last mentioned serve not only to favour the water-solubility of component II but also are necessary in order to obtain a homogeneous, clear film cured by stoving. This will be referred to herein as "compatibility" of the components. This is apparently due at least in part to mutual poly-etherification reactions, and primary hydroxyl groups are therefore preferred.

Besides the characteristic groups as defined above, the component II may also carry polymerisable groups which not only impart to the component a selfhardening capacity but, in the course of the final curing process, due to mutual reactions with the component I, particularly when the component I is a phenol alcohol, also cause compatibility of the comonents. The presence of groups of the said kind is achieved e. g. by employing acrylic, maleic, fumaric, citric acid, fatty acids of drying oils, natural resin acids, allyl and other unsaturated alcohols etc. as starting ingredients of the component II.

The acidity of the component II may be comparatively low. In many cases even an acid number of only about 40 secures sufficient water solubility of the total combination product. As a rule, an acid number of about 45–65 is chosen. A still higher acid number is nevertheless suitable in some cases. E. g. the molecular size of the component II may be increased to an appreciable extent due to continued esterification (provided adapted temperatures are employed for the final curing process). On the other hand also the proportion of component III can be correspondingly increased and this is favourable in some cases.

Whilst often the cheap ammonia is most suitably employed as component III in many cases water soluble, organic strong nitrogen bases are to be preferred, such as the lowest members of the primary, secondary, tertiary or quaternary aliphatic amines or mixtures thereof. In contradistinction to ammonia, they are not rendered ineffective in the cold by formaldehyde eventually set free, and thus the storage capability of the final composition or its aqueous solution respectively is not endangered. If poly-functional aliphatic amines are employed, such as ethylene diamine, putrescin, cadaverin etc., an additional increase of the molecular size is obtained due to the mutual interaction of the components II and III, and a further hardening effect respectively due to consequent reactions. When using alkylol amines, such as e. g. the commercially easily available triethanol amine, the hydroxyl equivalent number of the plasticising component (formed from components II and III), i. e. the weight in which averagely one hydroxy group is present, is diminished as compared with the component II per se.

As shown by the examples, the hydroxyl equivalent number of the component II (in a given case of conjunction with component III) suitable for the present process lies between about 145 and 280, in order to meet the dual task. This number must be adjusted to the nature of component I in order to secure the "compatibility" of the two components. As can also be seen from the examples this number must be comparatively low, e. g. it must not be higher than about 180 to 200 if component I is a phenol alcohol of common phenol. It can, however, be higher when part of the common phenol is replaced by "blocked" phenols and of course the more that is replaced the higher the hydroxyl equivalent number may be. Since, however, the hydroxyl groups present in component II have to accomplish still further functions their presence is desirable even when blocked phenols are employed exclusively. The highest hydroxyl equivalent number of the alkyd resins of the following examples, which merely serve for illustrating the present invention, is 280, as can be calculated from their formulation. Examples of "blocked" phenols are o-cresol, 1,2,4 xylenol (3.4 xylenol) and p-tertiary butyl phenol, the use of which both alone and in conjunction with common phenol is shown in the following examples. It will be observed that these compounds are ortho- and para-substituted phenols having only two free reaction favourable positions. A ratio of about, by weight, 3 parts of phenol to about 2 parts of a "blocked" phenol as shown by the following Example 2, permits increasing the hydroxyl equivalent number to a range of about 240 to 280.

Also the presence of unsaturated groups in component II permits increasing the hydroxyl equivalent number to some extent since, as said above, these groups are capable of undergoing mutual reactions with phenol alcohols.

In order to prevent disturbances of the flow, it is in general advisable to restrict the hydroxyl or other hydrophilic groups in component II to the proportion sufficient for securing water solubility and consequently simultaneously to increase the proportion of slowly reactive compounds in component I to an extent sufficient to secure compatibility. In the case of condensation products from urea or equivalent compounds with formaldehyde, the necessary diminished hardening capacity is achieved by means of partial etherification of their methylol groups with a low molecular weight monohydric alcohol.

As I have found, the lowest semi-ethers of glycol or di-glycol, such as the commercial "Cellosolve" have proved to be particularly suitable for such etherification since they give etherification products which are distinguished by an even flow when applied to a surface and yet are water-soluble. The compatibility is advanced by the co-employment of phenol alcohols, particularly those derived from "blocked" phenols.

If the component II is an alkyd resin the desirable hydrophilic character is secured simply by selecting a suitable esterifying agent, e. g. polyglycols. In order to achieve a large number of free, preferably primary hydroxyl groups in the molecule (i. e. a hydroxyl equivalent number sufficiently low for obtaining compatibility with component I), pentaerythritol, di- and polypentaerythritol are particularly adapted, or analogous polyalcohols obtained from interacting formaldehyde with aldehydes or ketones, e. g. trimethylolpropane, Eneaheptit, tetramethylolcyclohexanol etc. Notwithstanding the hydroxyl compounds being generally used in great excess over the equivalent proportion the following rule is to be observed in order to obtain alkali solubility of the alkyd resin: the molecular sum of all poly- and monohydric alcohols employed per each mol of n-basic (poly- and monobasic) carboxylic acid must not or must not substantially exceed $n-1$, while care must be taken that no mutual esterification of the monovalent starting materials occasionally employed takes place. As polybasic carboxylic acids there may be used aliphatic, hydroaromatic or aromatic, saturated or unsaturated acids, such as succinic, adipic, sebacic, citric, maleic, fumaric, hexahydrophthalic, camphoric, phthalic acid, etc. or the corresponding anhydrides. Also not distinctly defined, noncrystalline polycarboxylic compounds (and their anhydrides respectively) are serviceable, such as are formed by interacting maleic anhydride with relatively high molecular compounds having conjugated double-bonds, e. g. abietic acid (rosin), ricinenic, eleostearic acid and the corresponding oils as well as the pitchlike distillation residues from natural or artificially obtained fatty acids.

A further feature of my invention consists in the presence of relatively large saturated or unsaturated aliphatic or alicyclic molecular groups in at least one component, by which surface imperfections of the aqueous varnishes when applied to an object are obviated. E. g. methylol compounds derived from so-called alkylphenol, such as propyl-, butyl-, etc. phenol are employed as component I, exclusively or in part; or the active methylol groups of the component, more particularly of aminoplasts, are partially etherified by suitable means (see above). It is a surprising fact that phenol alcohols of said kind may be employed or at least co-employed despite their very poor water solubility. Such comparatively large aliphatic or alicyclic groups are most suitably linked in the molecule of component II. E. g. there are introduced high molecular fatty or resin acids or alcohols or long chain polycarboxylic acids into the molecule of an alkyd (component II). As more specifically illustrated in the following examples, these groups, which, as previously indicated, may be aliphatic or alicyclic, should contain at least 6 carbon atoms. If the dilutability of the total composition with water is poor due to an insufficient hydrophylic character of the components this deficiency mostly can be overcome by adding a small proportion of a water compatible organic solvent.

Provided the component III consists of ammonia or another base which is easily volatile or is rendered ineffective by formaldehyde being split off the compounds of such bases with substances of relatively strong acidic nature act as accelerators of the final curing process. These compounds may be formed separately or simultaneously when adding the component III to the other ingredients by employing the acidic substances themselves. Adapted acidic substances (or compounds thereof respectively) which, of course, are to be employed in catalytic proportion only are e. g. sulfonic acids, partial esters of sulfuric or phosphoric acid, chlorinated acetic acid etc.

The present process may be varied in that a limited proportion of component I may be caused to react at least to a limited extent with component II by application of heat before the combination with component III and the formation of the aqueous solution respectively is effected. If component I is a phenol alcoheol, more particularly derived from a "blocked" so-called alkyl phenol, the component II ought to contain polymerisable groups which, as said already, readily give rise to mutual reactions with component I. An increase of the molecular state of the total composition and consequently a quicker set of the aqueous varnish is achieved thereby.

Probably all three components take part in the formation of the macro-molecular state in the course of the final curing under heat. By means of the present invention highly elastic and adhesive films of extreme hardness can be obtained; and particularly the employment of a phenolic hardenable component enables the formation of coats which after suitable stoving exhibit extreme resistance even to boiling water.

The practical application of the present process, of course, is subject to many variations, as also can be seen from the following examples. It may further be varied by the coemployment of resinlike substances which are water compatible per se, such as partially or wholly saponified polyvinyl esters, certain partial cellulose esters or ethers and other hydroxyl compounds.

The field of application of the products obtained according to the present invention is very wide. Aqueous solutions prepared therefrom can replace normal stoving varnishes for series coatings (primers as well as finishes) of metal objects of all kind by spraying, dipping or rolling. They can be used as heat drying binding and impregnating agents, for example for the production of water-resistant abrasive paper, and for impregnating materials and fabrics. Finally, they or their solutions can also serve as cold drying coatings, especially when it is a matter of moist under coats. If ammonia was employed as component III also in the cold insolubility in water comes into being gradually. Apart from the economically very important saving in expensive solvents, a great advantage of the products in their use consists in that danger of fire is completely excluded and that they are harmless as regards industrial hygiene.

The stoving temperatures when using a phenolic component I lie above about 140° C., whilst in combination with aminoplasts as component I the stoving temperatures can be reduced to about 70–80° C. assuming a stoving time of about half an hour. In this case therefore wooden articles, fabrics, etc. can be coated or impregnated.

Since in many cases even smaller proportions of the bases suffice than are necessary for complete neutralization (or even alkalization), alkali sensitive pigments such as Prussian Blue and Chromo Yellow can be used for the production of enamels.

*Examples*

1. A mixed ester (alkyd resin) with an acid number of about 65 to 70 was produced from 210 parts by weight of citric acid, 125 parts by weight of n-hexyl alcohol and 100 parts by weight of pentaerythritol. The alkyd resin was mixed with a neutralized water-soluble condensation product (phenol alcohol mixture), obtained from 150 parts by weight of phenol and 200 parts by weight of 30% formaldehyde with the aid of a strong alkaline catalyst at normal or moderately raised temperature, and to this mixture there was added so much ammonia or a water-soluble organic nitrogen base that a clear solution remained even on extensive dilution.

An approximately 70% aqueous solution was obtained which could be further diluted as desired with water, at any rate after addition for example of ammonia until neutral. In order to employ the product as a dipping or spraying lacquer, it was diluted to a solid content of 35 to 40% by weight. A metal sheet or other metal object to be coated was first carefully freed from grease and preferably roughened by treatment with mineral acids or mechanically. After application of the aqueous varnish solution, by spraying or dipping the metal sheets and stoving at 170 to 180° C. for 15 to 30 minutes, a tightly adhering brilliant lacquer, resistant to bending, was obtained which was even resistant to hot water.

When a part of the condensation product of phenol was replaced by a similar product of a higher homologue, for example p-tertiary butyl phenol dialcohol, the evenness of the film was further improved. In spite of the quite small water compatibility of the last mentioned condensation product (it takes up approximately only 10% of its dry weight) up to about 150 parts thereof could be incorporated even when alone with the above described ester, the ability of the total composition to be diluted with water yet being sufficient. If necessary it can be increased by the co-employment of, for example, glycol ethyl mono-ethers, or instead of ammonia a stronger base is used, for example triethanolamine, ethylene diamine, etc., and the solution is made alkaline. In the present case the addition is to be recommended of an acid accelerator, for example a partial phosphoric acid ester, which makes it possible to reduce the stoving temperature from about 180° to 140° C., whereby practically colourless film layers are obtained.

2. An alkyl resin with an acid number of 60 to 70 was produced from 100 parts by weight of phthalic anhydride, 150 parts by weight of a drying oil and 75 to 80 parts by weight of pentaerythritol. The oil was first reacted (reesterified) with a part of the pentaerythritol in known manner in order to make possible a smooth interaction with the phthalic acid anhydride. The alkyd resin on addition of dilute ammonia formed a turbid and viscous soap. By combination thereof with a mixture of phenol alcohols, which had been produced from 90 parts by weight of phenol and 60 parts by weight of a xylenol fraction, containing mainly 1,2,4-xylenol (3,4-xylenol), and 180 parts of formaldehyde (40% by volume), and which could only be diluted to a very limited extent with water, a clear smoothly flowing product was obtained which could be diluted to any desired extent with water. After appropriate dilution it could be employed, like the products obtained as described in Example 1, as a dipping or spraying varnish, for industrial stoving lacquering. After stoving at about 160° C., which temperature can further be reduced by the addition of acid accelerators, a coat was obtained which was completely resistant to boiling water.

The product can, if desired, also serve as a base for a paint which gradually becomes insensitive to water and hardens. In this case a drying accelerator is preferably added, for example, cobalt acetate, which reacts with a small part of the ammonium soap.

3. 40 parts by weight of rosin were reacted with 10 parts by weight of maleic acid in known manner and thereafter 40 parts by weight of the fatty acid of a drying oil, 20 parts by weight of the so-called fatty acid first runnings ($C_6$ to $C_9$) obtained from the oxidation of paraffine, and 45 parts by weight of tetramethylolcyclohexanol were added and heated with stirring to 220° C. for so long until an acid number of about 60 was obtained. The fatty acid first runnings which escaped at first were continually returned to the reaction mixture.

The mixed ester obtained was mixed with a neutralized condensation product, obtained at about 30° C. with the aid of strong alkalis from 45 parts by weight of phenol, 15 parts by weight of o-cresol and 80 parts by weight of formaldehyde (30%), and with a sufficient quantity of ammonia to obtain a slightly alkaline reaction. The combination product could be diluted with water, not indeed to an unlimited extent, but to an extent wholly sufficient for producing dipping or spraying consistency. If desired about 15 parts by weight (i. e. about 10% of the total vehicle) of n- or sec-butanol are added in order to support the solubility and fluidity of the synthetic resin mass and of its solution respectively. In particular on addition of accelerators of the above mentioned kind (and a corresponding quantity of ammonia) to the aqueous solution, a highly brilliant coating was obtained at a stoving temperature of about 170° C.

The rosin and the drying fatty acid for economical reasons can be replaced by the cheap and accessible tall oil in corresponding quantity and composition.

4. From 120 parts by weight of a drying oil, 70 parts by weight of pentaerythritol and 50 parts by weight of adipic acid an almost neutral ester was first prepared which was then heated in a separate working process for a short time to 180° C. with 35 parts by weight of phthalic anhydride. The acid mixed ester obtained in this way had an acid number of about 50. It was mixed with a neutralized liquid condensation product (one part of component I) obtained from 30 parts by weight of p-tertiary butyl phenol and 40 parts by weight of 30% formaldehyde by means of alkalis, and with a water-soluble urea resin (the other part of component I) obtained as follows:

180 parts by weight of dimethylol urea, 5 parts by weight of paraformaldehyde, 450 parts by weight of ethylene glycol ethyl mono-ether, and sufficient of a suitable acid catalyst to give a pH of about 5.5 were heated for several hours on a boiling water bath until the reaction mixture contained about 35% of non-volatile components. Thereafter the reaction water formed was distilled off in vacuo together with glycol ether still remaining free.

After addition of ammonia or other equivalent base, a product was obtained which could be diluted as desired with water. A varnish produced therefrom with a content of about 30% of solid body gave, when stoved at 120 to 140° C. a smooth brilliant and flexible coat. After addition of acid accelerators the stoving temperature could be reduced to 70 to 80° C. with a stoving period of half an hour, a film resistant to cold water being obtained.

In the foregoing example dimethylol urea could be replaced by an amorphous viscous water-soluble condensation product obtained from excess formaldehyde and urea and a corresponding quantity of additional urea.

What I claim is:

1. A composition of matter being water soluble, at least in the presence of a subordinate proportion of organic water-miscible solvent, which comprises the combination product of the following components: (I) a hydrophilic, hardenable, low molecular methylol compound selected from the group consisting of (a) phenol alcohols derived from phenols having only one phenolic OH per nucleus and a part thereof at least, being phenols selected from the group consisting of ortho- and para-substituted phenols having only two reactive positions and (b) reaction products of formaldehyde with a compound selected from the group consisting of urea and melamine, the hardening capacity of said reaction products being diminished by partial etherification of their methylol groups with a low molecular weight mono-hydric alcohol, (II) a plasticizing alkyd resin modified by a compound containing at least 6 carbon atoms, any cyclic structures present in said compound being alicyclic structures only, in the production of which resin a considerable excess of alcoholic OH groups over COOH groups is employed, said resin having an acid number of at least about 40 and having 1 gram hydroxyl group in 145 to 280 grams of said resin, and (III) a water soluble base selected from the group consisting of ammonia and strong organic nitrogen bases, said base forming a soap with component II, the said composition being substantially neutral.

2. A composition of matter being water soluble, at least in the presence of a subordinate proportion of organic water-miscible solvent, which comprises the combination product of the following components: (I) a hydrophilic, hardenable, low molecular methylol compound selected from the group consisting of (a) phenol alcohols derived from phenols having only one phenolic OH per nucleus and a part thereof at least, being phenols selected from the group consisting of ortho- and para-substituted phenols having only two reactive positions and (b) reaction products of formaldehyde with a compound selected from the group consisting of urea and melamine, the hardening capacity of said reaction products being diminished by partial etherification of their methylol groups with a low molecular weight mono-hydric alcohol, (II) a plasticizing alkyd resin modified by a compound containing at least 6 carbon atoms, any cyclic structures present in said compound being alicyclic structures only, in the production of which resin a considerable excess of alcoholic OH groups over COOH groups is employed, said resin having an acid number of at least about 40 and having 1 gram hydroxyl group in 145 to 280 grams of said resin, and (III) ammonia forming a soap with component II, the said composition being substantially neutral.

3. A substantially neutral liquid composition comprising the combination product of: (I) a hydrophilic, hardenable, low molecular methylol compound selected from the group consisting of (a) phenol alcohols derived from phenols having only one phenolic OH per nucleus and a part thereof at least, being phenols selected from the group consisting of ortho- and para-substituted phenols having only two reactive positions and (b) reaction products of formaldehyde with a compound selected from the group consisting of urea and melamine, the hardening capacity of said reaction products being diminished by partial etherification of said reaction products being diminished by partial etherification of their methylol groups with a low molecular weight mono-hydric alcohol, (II) a plasticizing alkyd resin modified by a compound containing at least 6 carbon atoms, any cyclic structures present in said compound being alicyclic structures only, in the production of which resin a considerable excess of alcoholic OH groups over COOH groups is employed, said resin having an acid number of at least about 40 and having 1 gram hydroxyl group in 145 to 280 grams of said resin, (III) a water soluble base selected from the group consisting of ammonia and strong organic nitrogen bases, said base forming a soap with component II, and (IV) water in the amount providing a solid content of the neutral liquid of at least about 30%.

4. A composition of matter being water soluble, at least in the presence of a subordinate proportion of organic water-miscible solvent, which comprises the combination product of the following components: (I) hydrophilic, hardenable, low molecular phenol alcohols derived from phenols having only one phenolic OH per nucleus, a part of said phenols being selected from the group consisting of ortho- and para-substituted phenols having only two reactive positions, (II) a plasticizing alkyd resin modified by a compound containing at least 6 carbon atoms, any cyclic structures present in said compound being alicyclic structures only, in the production of which resin a considerable excess of alcoholic OH groups over COOH groups is employed, said resin having an acid number of at least about 40 and having 1 gram hydroxyl group in 145 to 280 grams of said resin, and (III) ammonia forming a soap with component II, the composition being substantially neutral.

5. A composition of matter as claimed in claim 4 in which the alcoholic OH groups taking part in the production of component II are predominantly, at least, primary alcohol OH groups.

6. A composition of matter as claimed in claim 4 in which component II comprises a carbon chain derived from a higher fatty acid.

7. A composition of matter as claimed in claim 4 in which component II comprises polymerizable C=C double linkages.

8. A composition of matter as claimed in claim 4 in which component II is an alkyd resin partially at least derived from a polycarboxylic compound formed by reacting maleic anhydride with a monocarboxylic acid having conjugated double bonds.

9. A composition of matter as claimed in claim 1 in which component III is a mono-amine carrying at least one hydroxyl group.

10. A composition of matter being water soluble, at least in the presence of a subordinate proportion of organic water-miscible solvent, which comprises the combination product of the following components: (I) a hydrophilic, hardenable, low molecular methylol compound selected from the group consisting of (a) phenol alcohols derived from phenols having only one phenolic OH per nucleus and a part thereof at least being phenols selected from the group consisting of ortho- and para-substituted phenols having only two reactive positions, and (b) reaction products of formaldehyde with a compound selected from the group consisting of urea and melamine, the hardening capacity of said reaction products being diminished by partial etherification of their methylol groups with a low molecular weight mono-hydric alcohol, (II) a plasticizing alkyd resin modified by a compound containing at least 6 carbon atoms, any cyclic structures present in said compound being alicyclic structures only, in the production of which resin a considerable excess of alcoholic OH groups over COOH groups is employed, said resin having an acid number of at least about 40, and hydroxyl groups, and (III) a mono-amine carrying at least one hydroxyl group and forming a soap with component II, the sum of hydroxyl groups present in components II and III being 1 gram hydroxyl group in 145 to 280 grams of the soap formed, the said composition being substantially neutral.

11. A composition of matter which is water soluble, at least in the presence of a subordinate proportion of organic water-miscible solvent, which comprises the combination product of the following components: (I) a hydrophilic, hardenable, low molecular methylol compound derived from phenols having only one phenolic OH per nucleus, and part, at least, being p. tert. butyl phenol, (II) a plasticizing alkyd resin modified by a compound containing at least 6 carbon atoms, any cyclic structures present in said compound being alicyclic structures only, in the production of which resin a considerable excess of alcoholic OH groups over COOH groups is employed, said resin having an acid number of at least about 40 and having 1 gram hydroxyl group in 200 to 280 grams of said resin, and (III) ammonia forming a soap with component II, the composition being substantially neutral.

12. A composition of matter which is water soluble, at least in the presence of a subordinate proportion of organic water-miscible solvent, which comprises the combination product of the following components: (I) a hydrophilic, hardenable, low molecular methylol compound derived from a mixture of phenols having only one phenolic OH per nucleus, a part of said phenols being selected from the group consisting of ortho- and para-substituted phenols having only two reactive positions, (II) a plasticizing alkyd resin modified by a compound containing at least 6 carbon atoms, any cyclic structures present in said compound being alicyclic structures only, in the production of which resin a considerable excess of alcoholic OH groups over COOH groups is employed, said resin having an acid number of at least about 40 and having 1 gram hydroxyl group in 200 to 280 grams of said resin, and (III) ammonia forming a soap with component II, the composition being substantially neutral.

13. A composition of matter being water soluble, at least in the presence of a subordinate proportion of organic water-miscible solvent, which comprises the combination product of the following components: Components I and II being employed in proportions, by weight, of about 1 to 1 to 1 to 1.7, respectively; (I) hydrophilic, hardenable, low molecular methylol compounds derived from a mixture of about, by weight, 3 parts phenol and about 2 parts of a phenol selected from the group consisting of ortho- and para-substituted phenols having only two reactive positions, (II) a plasticizing alkyl resin modified by a compound containing at least 6 carbon atoms, any cyclic structures present in said compound being alicyclic structures only, in the production of which resin a considerable excess of alcoholic OH groups over COOH groups is employed, said resin having an acid number of about 40 to 70, and about 1 gram hydroxyl group in 200 to 280 grams of said resin, and (III) ammonia forming a soap with component II, the composition being substantially neutral.

14. A compositoin of matter being water soluble, at least in the presence of a subordinate proportion of organic water-miscible solvent, which comprises the combination product of the following components: (I) a hydrophilic, hardenable, low molecular methylol compound derived from the reaction of formaldehyde with urea, the hardening capacity of said reaction compound being diminished by partial etherification of its methylol groups with a semi-ether selected from the group consisting of semi-methyl and semi-ethyl ethers of ethylene glycol and of diethylene glycol, (II) a plasticizing alkyd resin modified by a compound containing at least 6 carbon atoms, any cyclic structures present in said compound being alicyclic structures only, in the production of which resin a considerable excess of alcoholic OH groups over COOH groups is employed, said resin having an acid number of at least about 40 and having 1 gram hydroxyl group in 145 to 280 grams of said resin, and (III) a water soluble base selected from the group consisting of ammonia and strong organic nitrogen bases, said base forming a soap with component II, the said composition being substantially neutral.

15. A composition of matter as claimed in claim 12 in which component I is a hydrophilic, hardenable, low molecular methylol compound derived from a mixture of phenols having only one phenolic OH per nucleus, said mixture containing an ortho-substituted phenol having only two reactive positions and having a hydrocarbon group containing 1 to 4 carbon atoms as the substituent.

16. A composition of matter as claimed in claim 12 in which component I is a hydrophilic, hardenable, low molecular methylol compound derived from a mixture of phenols having only one phenolic OH per nucleus, said mixture containing a para-substituted phenol having only two reactive positions and having a hydrocarbon group containing 1 to 4 carbon atoms as the substituent.

References Cited in the file of this patent

UNITED STATES PATENTS

| Number | Name | Date |
| --- | --- | --- |
| 1,780,375 | Bradley | Nov. 4, 1930 |
| 1,967,220 | Barrett et al. | July 24, 1934 |
| 2,022,004 | Larson | Nov. 26, 1935 |
| 2,074,814 | Smith | Mar. 23, 1937 |
| 2,350,861 | Argy et al. | June 6, 1944 |

FOREIGN PATENTS

| Number | Country | Date |
| --- | --- | --- |
| 413,628 | Great Britain | of 1934 |
| 889,799 | France | Oct. 11, 1943 |

OTHER REFERENCES

Chemical Age, May 20, 1939, pp. 373–374.